United States Patent [19]

Boston

[11] 4,004,079
[45] Jan. 18, 1977

[54] METHOD AND APPARATUS FOR DUAL RESOLUTION PHOTOGRAPHIC REPRODUCTION OF LINE AND CONTINUOUS TONE GRAPHIC MATERIALS

[75] Inventor: William Thomas Boston, Melrose, Mass.

[73] Assignee: Optronics International, Inc., Chelmsford, Mass.

[22] Filed: Nov. 14, 1975

[21] Appl. No.: 632,015

[52] U.S. Cl. .................. 358/256; 178/DIG. 3; 358/283; 358/302
[51] Int. Cl.² .................................. H04N 1/26
[58] Field of Search ............ 178/6, DIG. 3, 6.7 R, 178/6.6 B

[56] References Cited

UNITED STATES PATENTS

| | | | |
|---|---|---|---|
| 2,629,010 | 2/1953 | Graham | 178/6.8 |
| 3,347,981 | 10/1967 | Kagan | 178/5 |
| 3,459,888 | 8/1969 | Sokolov | 178/6 |
| 3,462,547 | 8/1969 | Macouski | 178/7.1 |
| 3,739,088 | 6/1973 | Landsman | 178/6.6 B |
| 3,806,641 | 4/1974 | Crooks | 178/6.7 R |
| 3,819,854 | 6/1974 | Kolb | 178/6.7 R |
| 3,949,159 | 4/1976 | Ricards | 178/6.6 B |

*Primary Examiner*—Howard W. Britton
*Attorney, Agent, or Firm*—Richard J. Birch

[57] ABSTRACT

A method and apparatus are disclosed for producing photographic reproductions of line and continuous tone graphic materials. The invention is useful in the newspaper field for opto-electrically producing plate-ready negatives or plates themselves from line and continuous tone copy. The line and continuous tone graphic materials are scanned incrementally to produce high resolution signals representative of the gray levels of incremental areas of both the line and continuous tone materials. A plurality of the high resolution signals representing the gray levels of the incremental areas of the scanned continuous tone material are combined to produce low resolution signals representing the gray levels of larger, low resolution incremental areas of the scanned continuous tone graphic material. The high and low resolution signals are employed to control an incremental, scan exposure of a photosensitive member. The photosensitive member receives an exposure that is a function of the gray levels of the high resolution incremental areas of the line graphic material and of the gray levels of the low resolution incremental areas of the continuous tone graphic material. Significant reductions in data processing capacity are achieved by processing the continuous tone gray level information in a low resolution format.

12 Claims, 1 Drawing Figure

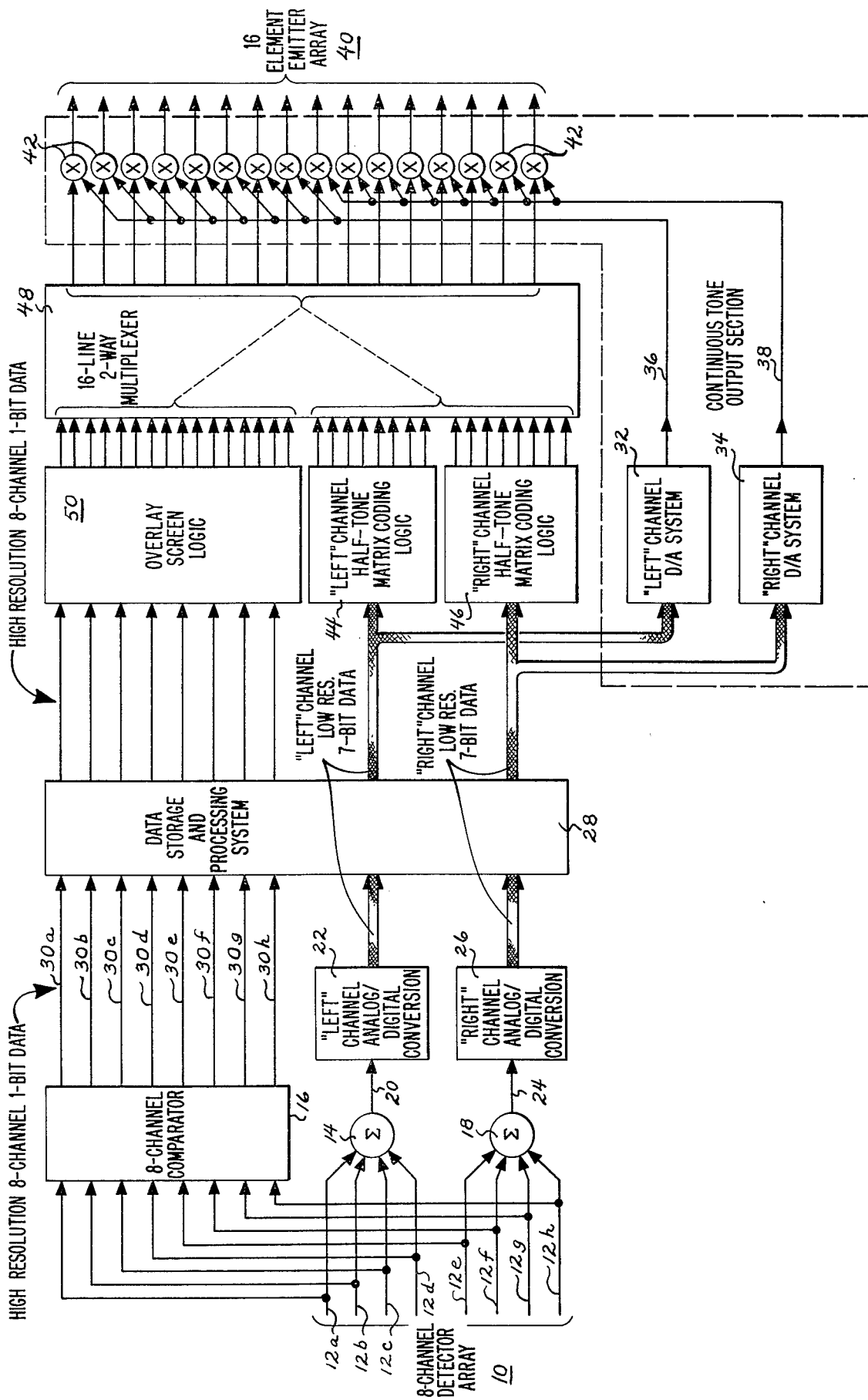

METHOD AND APPARATUS FOR DUAL RESOLUTION PHOTOGRAPHIC REPRODUCTION OF LINE AND CONTINUOUS TONE GRAPHIC MATERIALS

BACKGROUND OF THE INVENTION

The present invention relates to systems for photographically reproducing both line and continuous tone graphic material and more particularly to a dual resolution method and apparatus for reproducing such materials.

The newspaper industry has seen in the last few years considerably activity directed toward reducing or eliminating many of the manual operators required in the production of plate-ready negatives. Photo-typesetters now provide hyphenated and justified line copy for the pasteup room directly from a keyboard terminal. In the pasteup room the line copy is combined manually with other line graphic materials e.g. artwork and with continuous tone graphic materials in a "pasteup" of the newspaper page. After the desired page composition has been achieved, the pasteup page is photographed to obtain a plate-ready negative.

The page makeup operation using manual pasteup techniques is time consuming, inefficient and labor intensive. Recent efforts have focused on electronic systems for composing newspaper pages. An automatic page composition system that is capable of merging both line and continuous tone copy in the production of plate-ready negatives has been described in the trade literature. See *Inland Printer/American Lithographic*, July 1975, Pages 40I–40K.

This system, called "Pagitron" by Optronics International, Inc., utilizes a scanner/plotter for the input/output functions with intermediate computer processing and storage of the scanned line and continuous tone copy. The copy, which can be scanned in randomly, is converted into digital form for computer processing and storage. Page makeup is performed by calling up selected blocks of copy on a visual display for editing, positioning, enlarging or reducing etc. After the page makeup has been completed, the digital signals representing the final page configuration are stored for subsequent use or are inputted to the plotter portion of the scanned/plotter for controlling the exposure of a plate-ready negative. Alternatively, the digital signals can be employed to control a laser plate maker.

Since the system utilizes digital processing and storage of all types of scanned graphics including, type, line artwork and continuous tone photographs, the data handling requirements are considerable when all of the various types of graphic material are processed and stored as high resolution bit images. However, it is not necessary to treat each type of graphic material in the same manner. If the line graphic material and the continuous tone graphic material are treated as high and low resolution data, respectively, significant data compression can be achieved with a concomitant reduction in data handling capacity and system expense.

It is accordingly a general object of the present invention to provide a method and apparatus for dual resolution photographic reproduction of line and continuous tone graphic material.

It is a specific object of the invention to provide a photographic reproduction method and apparatus in which line graphic material is processed at a high resolution while continuous tone graphic material is processed at a low resolution.

It is still another object of the invention to provide a method and apparatus for photographically producing half-tone reproductions of continuous tone originals at a low resolution and reproduction of line graphic originals at a high resolution.

It is a feature of the invention that both half-tone and continuous tone reproductions can be produced from continuous tone graphic originals at a low resolution.

It is still another feature of the invention that both line and continuous tone graphic materials can be scanned by the same instrumentality.

It is a further feature of the invention that both line and continuous tone graphic materials can be photoplotted by the same instrumentality.

These objects and features and other objects and features of the invention will best be understood from a detailed description of a preferred embodiment thereof selected for purposes of illustration and shown in block diagram form in the accompanying single FIGURE.

Referring now to the single FIGURE, there is shown in block diagram form an apparatus instructed in accordance with the present invention for providing dual resolution reproduction of line and continuous tone graphic materials. The line and continuous tone graphic materials or "copy" in newspaper terminology are scanned into the apparatus by means of a plural channel detector array 10. For purposes of illustration the detector array 10 is shown as an eight channel array.

The scanner detector array 10 produces on output lines 12a–12h analog signals representing the gray levels of incrementally scanned areas of the line and continuous tone graphic material. Assuming for purposes of discussion that each high resolution, incremental scan area or pixel is a 50 × 50 micron area, the eight channel detector array 10 will scan in each increment an area 400 × 50 microns. Since each pixel is 50 microns, the signals on detector array output lines 12a–12d represent in analog form the gray levels of four pixels i.e. a 200 × 50 micron area. In a similar manner, the analog signals on output lines 12e–12h represent the gray levels of another four pixels.

The analog signals on output lines 12a–12d are inputted to a summer 14 and to an eight channel comparator 16. The analog signals on the detector array output lines 12e–12h are inputted to another summer 18 and to the eight channel comparator 16. Each summer sums, algebraically combines, the analog gray level signals from four channels for four scanning increments. Since each scanning increment is 50 microns wide, the output from summer 14 on line 20 is an analog signal representing the combined gray levels of a low resolution 200 × 200 micron scan area formed by a 4 × 4 array of 50 micron pixels. The low resolution analog signal from summer 14 is converted to a digital low resolution signal by a "left" channel A/D converter 22. The output from A/D converter 22 is one 7-bit byte representing the gray level. This data is referred to for purposes of identification as the left channel.

The same analysis obtains with respect to the "right" channel in which the low resolution analog signal output from summer 18 is inputted to an A/D converter 26. The output from the right channel A/D converter is another one 7-bit byte representing the gray level of the right channel low resolution 200 × 200 micron scan area.

The outputs from the left and right channel analog-to-digital converters 22 and 26 are referred to herein as "low resolution" data because the summing action of summers 14 and 18 coarsens the scanning resolution from a high resolution 50 × 50 micron pixel to a larger, low resolution 200 × 200 micron incremental area. The low resolution mode of operation is employed in the present invention in connection with continuous tone graphic materials. The low resolution digital left and right channel data is inputted to a data storage and processing system 28 for subsequent utilization as will be explained below.

Line graphic material such as, type and line artwork, is processed in a high resolution mode as contrasted to the low resolution processing of continuous tone graphic material. The analog output signals from the eight channel detector array are inputted to the previously mentioned eight channel comparator 16. The comparator functions as an adjustable threshold to convert the analog gray level signals from each high resolution 50 × 50 micron pixel to corresponding 1-bit data which is outputted on lines 30a–30h. The parallel, binary information on output lines 30a–30h represents the thresholded gray level information from eight 50 × 50 micron pixels for each scan increment. This data is inputted to the data storage and processing system 28 for subsequent utilization.

It will be appreciated from the preceding discussion of the treatment of the line and continuous tone graphic information that continuous tone materials are scanned in on an area basis i. e. a 200 × 200 micron area while the line graphic material is scanned in on a line basis using a 50 × 50 pixel. Thus, the high resolution incremental pixel area is 50 × 50 microns and the low resolution incremental area is 200 × 200 microns.

The data storage and processing system 28 utilizes conventional hardware which normally would include a CPU, disc storage and an interactive display terminal with menu and keyboard inputs. Appropriate software is used to implement the desired data processing functions in conjunction with the hardware. For example, the line and continuous tone graphic material information in digital form can be called out on the interactive display terminal in visual form for editing, positioning, substitution, addition of new material, etc. In addition, the digital data can be manipulated to change gray levels, adjust contrast, reverse tones and perform other known operations. The data storage and processing system 28 is optional from the standpoint of the invention, but it would normally be included in a commercial implementation of the invention. For the purpose of this description, it is sufficient to note that the apparatus has available in high resolution format the digital data representing line graphic material and the low resolution digital data representing continuous tone material. Suitable control circuits (not shown) are used to control the data input to the data storage processing system 28 depending upon the particular type of graphic material being scanned by the detector array 10. Alternatively, both the high and low resolution data can be inputted to the data storage system since both types of data are available simultaneously from the initial high resolution data generated by the detector array.

Having described the input scanning operation for line and continuous tone graphic material, I will now discuss the outputting or plotting of this material on a photosensitive member. Assuming first that one wishes to output continuous tone graphic material in a continuous tone format as opposed to a half-tone format, the left and right channel low resolution 7-bit data representing the gray levels of the larger incremental areas i.e. the 200 × 200 micron areas, is inputted to corresponding left and right channel digital-to-analog convertors 32 and 34, respectively. The D/A convertors 32 and 34 produce analog signals on output lines 36 and 38 which represent the luminance or gray level information for each low resolution scanned area in the continuous tone graphic material.

The analog signals are used to intensity modulate the light source or sources of a photoplotter (not shown). The 16 element LED array 40 is representative of such a source. The analog gray level signals are gated through a plurality of AND gates 42 to the corresponding light emitting elements of array 40.

Suitable clock signals for the gates 42 can be obtained from conventional means (not shown). In the apparatus illustrated in the single Figure, clock information for gates 42 is derived from left and right channel half-tone matrix coding logic circuits 44 and 46, respectively, The half-tone matrix coding function of logic circuits 44 and 46 will be described below. For the moment it is sufficient to note that the circuits provide a clock pulse to turn on the AND gates 42 at the appropriate time.

The left channel analog gray level signal on output line 36 intensity modulates eight of the sixteen elements of the emitter array 40 while the right channel analog signal on output line 38 intensity modulates the remaining eight elements of the sixteen element emitter array. Each LED in the emitter array illuminates a 25 × 25 micron area on a photosensitive member (not shown) such as a plate-ready negative. Eight of the 25 micron emitter array elements correspond to four of the fifty micron detector array pixels. Expressed in slightly different terms, the 200 × 200 micron low resolution incremental scan area comprises 16 50 × 50 pixels while the corresponding 200 × 200 micron area on the output film is formed by 64 25 × 25 incrementally exposed areas.

In the continuous tone mode of operation, all sixty-four exposure areas on the output film receive the same amount of exposure. The exposure is a function of the analog signal from the appropriate left or right channel D/A converters 32 or 34. For newspaper reproductions, the continuous tone graphic original is converted into a half-tone picture on the photosensitive member by selectively exposing the 64 sub-areas which form the 200 × 200 micron picture incremental area. The selective exposure of the sixty-four sub-areas is produced by corresponding selective energization of the eight emitter elements in the left and right channel portions of the sixteen element emitter array 40. The appropriate coding signals for producing the desired exposure pattern are obtained from the previously mentioned left and right channel half-tone matrix coding logic circuits 44 and 46.

The coding logic signals from logic circuits 44 and 46 are applied to the emitter array AND gates 42 through a 16 line, two-way multiplexer 48. The multiplexer 48 controls the appropriate gating signals to AND gates 42 depending upon the particular mode of operation of the apparatus. For the reproduction of continuous tone graphic originals either as continuous tone output or a half-tone output, the multiplexer 48 directs the left and right channel matrix logic outputs to the corresponding left and right eight element segments of the sixteen emitter array 40.

In the case of line graphic originals, the multiplexer 48 directs the sixteen line outputs from overlay screen logic 50 to the corresponding sixteen elements of the emitter array 40. The overlay screen logic 50 receives as an input the high resolution eight channel 1-bit data representing line graphic material from the data storage and processing system 28. Each one of the eight input channels is converted into two output channels which are fed to the 16 line multiplexer 48. The 16 line outputs from multiplexer 48 functions as ON-OFF signals for the emitter array.

It will be appreciated from the preceding discussion that line and continuous tone graphic material can be photographically reproduced at high and low resolution levels with a concomitant reduction in the required data processing capacity of the apparatus. The continuous tone graphic original can be outputted as continuous tone or half-tone reproductions. It is also possible to produce gray scale reproductions of line and text using the high resolution line graphic mode in conjunction with a preselected gray level for the outputs of the left and right channel D/A's 32 and 34. The overlay screen logic can be used to create positive or negative overlay screens for the outputted material.

Other variations of the method and apparatus will now be appreciated by those skilled in the art. For example, the intensity modulated light source can be a laser of the illustrated LED array. The use of a laser light eliminates the need for the intermediate plate-ready negative because the laser can directly expose a photosensitive printing plate.

In addition, it should be understood that different effects can be achieved with the dual resolution system by treating the continuous tone graphic material as "line" graphic material and processing the continuous tone material through the high resolution channel. The converse is also feasible; the line graphic material can be processed as "continuous tone" material through the low resolution channel. Other combinations can be achieved by processing different portions of the same type of graphic material through the two resolution channels.

It is also possible to scan in half-toned graphic originals and process them as continuous tone materials in the low resolution channel. If the half-tone originals are then outputted as half-tones, one can vary the half-tone screen relationships between the half-tone original and the half-tone output. Alternatively, the half-tone originals can be processed and outputted as continuous tone materials. In this regard, half-tone graphic originals can be considered as continuous tone graphic material and, therefore, as used herein the term continuous tone graphic material should be construed to include half-tone graphic materials.

What I claim and desire to secure by Letters Patent of the United States is:

1. A method for reproducing line and continuous tone, graphic material comprising the steps of:
   1. opto-electrically scanning incremental areas of line and continuous tone graphic material and producing high resolution line graphic signals representative of the gray levels of incremental areas of the scanned line graphic materials and low resolution continuous tone graphic signals representative of the gray levels of incremental areas of the scanned continuous tone graphic material;
   2. photographically reproducing the line graphic material by scan exposing a photosensitive member in response to the high resolution line graphic signals to produce an exposure of the photosensitive member that is a function of the gray levels of the scanned line graphic material; and,
   3. photographically reproducing the continuous tone graphic material by scan exposing a photosensitive member in response to the low resolution continuous tone graphic signals to produce an exposure of the photosensitive member that is a function of the gray levels of the scanned continuous tone graphic material.

2. A method for reproducing line and continuous tone graphic materials comprising the steps of:
   1. opto-electrically scanning line graphic material to produce high resolution line graphic signals representative of the gray levels of the scanned line graphic material;
   2. opto-electrically scanning continuous tone graphic material and producing low resolution continuous tone graphic signals representative of the gray levels of the scanned continuous tone graphic material;
   e. photographically reproducing the line graphic material by scan exposing a photosensitive member in response to the high resolution line graphic signals to produce an exposure of the photosensitive member that is a function of the gray levels of the scanned line graphic material; and,
   4. photographically reproducing the continuous tone graphic material by scan exposing a photosensitive member in response to the low resolution continuous tone graphic signals to produce an exposure of the photosensitive member that is a function of the gray levels of the scanned continuous tone graphic material.

3. A dual resolution method for reproducing line and continuous tone graphic material comprising the steps of:
   1. opto-electrically scanning incremental, high resolution areas of line and continuous tone graphic material to produce corresponding high resolution signals representative of the gray levels of the incremental, high resolution areas of the scanned line and continuous tone graphic material;
   2. algebraically combining a plurality of the high resolution signals representative of the gray levels of the incremental, high resolution areas of the scanned continuous tone graphic material to produce low resolution signals representative of the gray levels of larger, low resolution incremental areas of the scanned continuous tone graphic material;
   3. photographically reproducing the line graphic material by incrementally, scan exposing a photosensitive member in response to the high resolution signals representative of the gray levels of the line graphic material to produce an exposure of the photosensitive member that is a function of the gray levels of the scanned, incremental high resolution areas of the line graphic material; and,
   4. photographically reproducing the continuous tone graphic material by incrementally, scan exposing a photosensitive member in response to the low resolution signals to produce an exposure of the photosensitive member that is a function of the gray levels of the larger, low resolution incremental areas of the scanned continuous tone graphic material.

4. A dual resolution method for reproducing line and continuous tone graphic material comprising the steps of:
1. opto-electrically scanning incremental, high resolution areas of line and continuous tone graphic material to produce corresponding high resolution signals representative of the gray levels of the incremental, high resolution areas of the scanned line and continuous tone graphic material;
2. algebraically combining a plurality of the high resolution signals representative of the gray levels of the incremental, high resolution areas of the scanned continuous tone graphic material to produce low resolution signals representative of the gray levels of larger, low resolution incremental areas of the scanned continuous tone graphic material;
3. photographically reproducing the line graphic material by incrementally, scan exposing a photosensitive member in response to the high resolution signals representative of the gray levels of the line graphic material to produce an exposure of the photosensitive member that is a function of the gray levels of the scanned, incremental high resolution areas of the line graphic material; and,
4. photographically reproducing in half-tones the continuous tone graphic material by incrementally, scan exposing in a half-tone matrix format a photosensitive member in response to the low resolution signals to produce an exposure of the photosensitive member that is a function of the gray levels of the larger, low resolution incremental areas of the scanned continuous tone graphic material.

5. A dual resolution method for reproducing line and continuous tone graphic material comprising the steps of:
1. opto-electrically scanning incremental, high resolution areas of line and continuous tone graphic material to produce corresponding analog high resolution signals representative of the gray levels of the incremental, high resolution areas of the scanned line and continuous tone graphic material;
2. algebraically combining a plurality of the analog high resolution signals representative of the gray levels of the continuous tone graphic material to produce low resolution analog signals representative of the gray levels of larger, low resolution incremental areas of the scanned continuous tone graphic material;
3. converting said low resolution analog signals into digital low resolution signals;
4. converting the analog high resolution signals representative of the gray levels of the line graphic material into digital high resolution signals;
5. storing and processing said high and low resolution digital signals;
6. converting the stored and processed low resolution digital signals into analog low resolution exposure signals;
7. photographically reproducing the line graphic material by incrementally, scan exposing a photosensitive member in response to the digital high resolution signals to produce an exposure of the photosensitive member that is a function of the gray levels of the scanned, incremental high resolution areas of the line graphic material; and,
8. photographically reproducing the continuous tone graphic material by incrementally, scan exposing a photosensitive member in response to the analog low resolution exposure signals to produce an exposure of the photosensitive member that is a function of the gray levels of the larger, low resolution incremental areas of the scanned continuous tone graphic material.

6. A dual resolution method for reproducing line and continuous tone graphic material comprising the steps of:
1. opto-electrically scanning incremental, high resolution areas of line and continuous tone graphic material to produce corresponding analog high resolution signals representative of the gray levels of the incremental, high resolution areas of the scanned line and continuous tone graphic material;
2. algebraically combining a plurality of the analog high resolution signals representative of the gray levels of the continuous tone graphic material to produce low resolution analog signals representative of the gray levels of larger, low resolution incremental areas of the scanned continuous tone graphic material;
3. converting said low resolution analog signals into digital low resolution signals;
4. converting the analog high resolution signals representative of the gray levels of the line graphic material into digital high resolution signals;
5. coding said low resolution digital signals into a half-tone matrix format;
6. photographically reproducing the line graphic material by incrementally, scan exposing a photosensitive member in response to the digital high resolution signals to produce an exposure of the photosensitive member that is a function of the gray levels of the scanned, incremental high resolution areas of the line graphic material; and,
7. photographically reproducing in half-tones the continuous tone graphic material by incrementally, scan exposing a photosensitive member in response to the half-tone matrix format coded digital low resolution signals to produce an exposure that is a function of the gray levels of the larger, low resolution incremental areas of the scanned continuous tone graphic material.

7. An apparatus for reproducing line and continuous tone, graphic material comprising:
1. means for opto-electrically scanning incremental areas of line and continuous tone graphic material to produce high resolution line graphic signals representative of the gray levels of incremental areas of the scanned line graphic materials and low resolution continuous tone graphic signals representative of the gray levels of incremental areas of the scanned continuous tone graphic material;
2. means for photographically reproducing the line graphic material by scan exposing a photosensitive member, said photographic means being responsive to the high resolution line graphic signals to produce an exposure of the photosensitive member that is a function of the gray levels of the scanned line graphic material; and,
3. means for photographically reproducing the continuous tone graphic material by scan exposing a photosensitive member, said photographic means being responsive to the low resolution continuous tone graphic signals to produce an exposure of the photosensitive member that is a function of the gray levels of the scanned continuous tone graphic material.

8. An apparatus for reproducing line and continuous tone graphic materials comprising:
 1. means for opto-electrically scanning line graphic material to produce high resolution line graphic signals representative of the gray levels of the scanned line graphic material;
 2. means for opto-electrically scanning continuous tone graphic material to produce low resolution continuous tone graphic signals representative of the gray levels of the scanned continuous tone graphic material;
 3. means for photographically reproducing the line graphic material by scan exposing a photosensitive member, said photographic means being responsive to the high resolution line graphic signals to produce an exposure of the photosensitive member that is a function of the gray levels of the scanned line graphic material; and,
 4. means for photographically reproducing the continuous tone graphic material by scan exposing a photosensitive member, said photographic means being responsive to the low resolution continuous tone graphic signals to produce an exposure of the photosensitive member that is a function of the gray levels of the scanned continuous tone graphic material.

9. A dual resolution apparatus for reproducing line and continuous tone graphic material comprising:
 1. means for opto-electrically scanning incremental, high resolution areas of line and continuous tone graphic material to produce corresponding high resolution signals representative of the gray levels of the incremental, high resolution areas of the scanned line and continuous tone graphic material;
 2. means for algebraically combining a plurality of the high resolution signals representative of the gray levels of the incremental, high resolution areas of the scanned continuous tone graphic material to produce low resolution signals representative of the gray levels of larger, low resolution incremental areas of the scanned continuous tone graphic material;
 3. means for photographically reproducing the line graphic material by incrementally, scan exposing a photosensitive member, said photographic means being responsive to the high resolution signals representative of the gray levels of the line graphic material to produce an exposure of the photosensitive member that is a function of the gray levels of the scanned, incremental high resolution areas of the line graphic material; and
 4. means for photographically reproducing the continuous tone graphic material by incrementally, scan exposing a photosensitive member, said photographic means being responsive to the low resolution signals to produce an exposure of the photosensitive member that is a function of the gray levels of the larger, low resolution incremental areas of the scanned continuous tone graphic material.

10. A dual resolution apparatus for reproducing line and continuous tone graphic material comprising:
 1. means for opto-electrically scanning incremental, high resolution areas of line and continuous tone graphic material to produce corresponding high resolution signals representative of the gray levels of the incremental, high resolution areas of the scanned line and continuous tone graphic material;
 2. means for algebraically combining a plurality of the high resolution signals representative of the gray levels of the incremental, high resolution areas of the scanned continuous tone graphic material to produce low resolution signals representative of the gray levels of larger, low resolution incremental areas of the scanned continuous tone graphic material;
 3. means for photographically reproducing the line graphic material by incrementally, scan exposing a photosensitive member, said photographic means being responsive to the high resolution signals representative of the gray levels of the line graphic material to produce an exposure of the photosensitive member that is a function of the gray levels of the scanned, incremental high resolution areas of the line graphic material; and,
 4. means for photographically reproducing in half-tones the continuous tone graphic material by incrementally, scan exposing in a half-tone matrix format a photosensitive member, said photographic means being responsive to the low resolution signals to produce an exposure of the photosensitive member that is a function of the gray levels of the larger, low resolution incremental areas of the scanned continuous tone graphic material.

11. A dual resolution apparatus for reproducing line and continuous tone graphic material comprising:
 1. means for opto-electrically scanning incremental, high resolution areas of line and continuous tone graphic material to produce corresponding analog high resolution signals representative of the gray levels of the incremental, high resolution areas of the scanned line and continuous tone graphic material;
 2. means for algebraically combining a plurality of the analog high resolution signals representative of the gray levels of the continuous tone graphic material to produce low resolution analog signals representative of the gray levels or larger, low resolution incremental areas of the scanned continuous tone graphic material;
 3. means for converting said low resolution analog signals into digital low resolution signals;
 4. means for converting the analog high resolution signals representative of the gray levels of the line graphic material into digital high resolution signals;
 5. means for storing and processing said high and low resolution digital signals;
 6. means for converting the stored and processed low resolution digital signals into analog low resolution exposure signals;
 7. means for photographically reproducing the line graphic material by incrementally, scan exposing a photosensitive member, said photographic means being responsive to the digital high resolution signals to produce an exposure of the photosensitive member that is a function of the gray levels of the scanned, incremental high resolution areas of the line graphic material; and, 8. means for photographically reproducing the continuous tone graphic material by incrementally, scan exposing a photosensitive member, said photographic means being responsive to the analog low resolution exposure signals to produce an exposure of the photosensitive member that is a function of the gray levels of the larger, low resolution incremental areas of the scanned continuous tone graphic material.

12. A dual resolution apparatus for reproducing line and continuous tone graphic material comprising:

1. means for opto-electrically scanning incremental, high resolution areas of line and continuous tone graphic material to produce corresponding analog high resolution signals representative of the gray levels of the incremental, high resolution areas of the scanned line and continuous tone graphic material;
2. means for algebraically combining a plurality of the analog high resolution signals representative of the gray levels of the continuous tone graphic material to produce low resolution analog signals representative of the gray levels of larger, low resolution incremental areas of the scanned continuous tone graphic material;
3. means for converting said low resolution analog signals into digital low resolution signals;
4. means for converting the analog high resolution signals representative of the gray levels of the line graphic material into digital high resolution signals;
5. means for coding said low resolution digital signals into a half-tone matrix format;
6. means for photographically reproducing the line graphic material by incrementally, scan exposing a photosensitive member, said photographic means being responsive to the digital high resolution signals to produce an exposure of the photosensitive member that is a function of the gray levels of the scanned, incremental high resolution areas of the line graphic material; and,
7. means for photographically reproducing in half-tones the continuous tone graphic material by incrementally, scan exposing a photosensitive member, said photographic means being responsive to the half-tone matrix format coded digital low resolution signals to produce an exposure that is a function of the gray levels of the larger, low resolution incremental areas of the scanned continuous tone graphic material.

* * * * *